(12) United States Patent
Di Maio

(10) Patent No.: US 10,919,251 B2
(45) Date of Patent: Feb. 16, 2021

(54) OPERATING GROUP FOR A CARTONING MACHINE, CARTONING MACHINE AND METHOD FOR FORMING A CARTON

(71) Applicant: I.M.A. INDUSTRIA MACCHINE AUTOMATICHE S.P.A., Ozzano dell'Emilia (IT)

(72) Inventor: Pierpaolo Di Maio, Castel San Pietro Terme (IT)

(73) Assignee: I.M.A. Industria Macchine Automatiche S.p.A.

( * ) Notice: Subject to any disclaimer, the term of this patent is extended or adjusted under 35 U.S.C. 154(b) by 164 days.

(21) Appl. No.: 15/768,613

(22) PCT Filed: Oct. 14, 2016

(86) PCT No.: PCT/IB2016/056147
§ 371 (c)(1),
(2) Date: Apr. 16, 2018

(87) PCT Pub. No.: WO2017/064649
PCT Pub. Date: Apr. 20, 2017

(65) Prior Publication Data
US 2018/0297316 A1    Oct. 18, 2018

(30) Foreign Application Priority Data
Oct. 16, 2015 (IT) .................... 102015000062620

(51) Int. Cl.
*B31B 50/80* (2017.01)
*B31B 50/07* (2017.01)
(Continued)

(52) U.S. Cl.
CPC .......... *B31B 50/804* (2017.08); *B31B 50/06* (2017.08); *B31B 50/062* (2017.08); *B31B 50/07* (2017.08);
(Continued)

(58) Field of Classification Search
CPC ........ B31B 2100/0022; B31B 2120/30; B31B 50/06; B31B 50/062; B31B 50/07;
(Continued)

(56) References Cited

U.S. PATENT DOCUMENTS 2,762,274 A * 9/1956 Kerr .............................. 493/181
3,965,643 A    6/1976 Sherman
(Continued)

FOREIGN PATENT DOCUMENTS

DE    1909119 A1 *  9/1969   ........... B65B 43/285
DE    1909119 A1     9/1969
(Continued)

OTHER PUBLICATIONS

Machine translation of Deldon (DE 1909119 A1) via ESPACENET (Year: 1969).*

*Primary Examiner* — Chelsea E Stinson
*Assistant Examiner* — Himchan Song
(74) *Attorney, Agent, or Firm* — Laubscher & Laubscher, P.C.

(57) ABSTRACT

An operating group for a cartoning machine is arranged to move a blank that is intended to form a carton adapted to contain one or more products, and includes a magazine suitable for housing a plurality of blanks folded in a planar manner; gripping arrangement that is configured for retaining the blank and is movable at least between a removing position in which the gripping arrangement removes the blank arranged in the magazine in a planar configuration, which is horizontal, and a delivery position in which the gripping arrangement delivers the blank arranged in a tridimensional unfolded configuration, which is vertical with respect to the planar configuration; in which the gripping arrangement is rotated around a rotation axis such as to travel along a closed loop path; the removing position from (Continued)

the magazine being arranged above the closed loop transfer path travelled by the gripping arrangement, such that the gripping arrangement can remove directly from the magazine said blank in the horizontal folded planar configuration.

14 Claims, 7 Drawing Sheets

(51) Int. Cl.
- *B31B 50/06* (2017.01)
- *B65B 43/28* (2006.01)
- *B65G 47/84* (2006.01)
- *B31B 120/30* (2017.01)
- *B31B 100/00* (2017.01)
- *B65B 43/18* (2006.01)
- *B65B 43/26* (2006.01)

(52) U.S. Cl.
CPC .......... *B31B 50/802* (2017.08); *B65B 43/285* (2013.01); *B65G 47/848* (2013.01); *B31B 2100/0022* (2017.08); *B31B 2120/30* (2017.08); *B65B 43/185* (2013.01); *B65B 43/265* (2013.01)

(58) Field of Classification Search
CPC ... B31B 50/802; B31B 50/804; B65B 43/185; B65B 43/265; B65B 43/285; B65G 47/848
USPC .................................................. 493/313–316
See application file for complete search history.

(56) References Cited

U.S. PATENT DOCUMENTS

| | | | | |
|---|---|---|---|---|
| 4,194,442 A | * | 3/1980 | Martelli | B65H 5/12 493/316 |
| 4,537,587 A | * | 8/1985 | Langen | B31B 50/00 493/315 |
| 5,061,231 A | * | 10/1991 | Dietrich | B65B 43/265 493/315 |
| 5,067,937 A | * | 11/1991 | Aschaber | B31B 50/80 493/310 |
| 6,383,123 B1 | * | 5/2002 | Ehring | B65B 43/265 493/315 |
| 6,503,180 B1 | * | 1/2003 | Pluschow | B65B 43/185 493/309 |
| 8,123,030 B2 | * | 2/2012 | Hein | B65B 19/20 206/273 |
| 8,986,183 B2 | * | 3/2015 | Monti | B65B 43/52 493/315 |
| 2009/0233779 A1 | * | 9/2009 | Klein | B65B 43/185 493/315 |
| 2016/0107779 A1 | * | 4/2016 | Weidner | B65B 43/52 493/315 |

FOREIGN PATENT DOCUMENTS

| | | |
|---|---|---|
| EP | 0076141 A2 | 9/1982 |
| EP | 0989941 A1 | 4/2000 |
| FR | 2675077 A1 | 10/1992 |
| WO | 9857857 A1 | 12/1998 |

* cited by examiner

US 10,919,251 B2

OPERATING GROUP FOR A CARTONING MACHINE, CARTONING MACHINE AND METHOD FOR FORMING A CARTON

CROSS-REFERENCE TO EARLIER APPLICATIONS

This application is a § 371 of PCT/IB2016/056147 filed Oct. 14, 2016. PCT/IB2016/056147 claims priority of IT102015000062620 filed Oct. 16, 2015. The entire content of these applications are incorporated herein by reference.

BACKGROUND OF THE INVENTION

The invention relates to an operating group for a cartoning machine, in particular an operating group arranged to remove a blank, increase a volume of the blank to erect a carton, and deliver the carton to a conveying system.

The invention further relates to a cartoning machine for packaging one or more products, such as, for example, vials, bottles, jars, or the like, inside a single carton.

The invention further relates to a method for forming a carton.

In cartoning machines of known type an operating group is provided that removes a blank from a magazine and the blank is delivered as an erected carton to a conveying system, which is movable along a conveying direction, which advances the erected blank as far as a product inserting station. The operating group removes the blank in a planar configuration or flat configuration and delivers the blank to a tridimensional configuration, in which the blank has increased its volume becoming an erected carton. The operating group thus also has, further to the function of transferring the blank, also the function of erecting a carton from the blank increasing its volume.

The blank in the tridimensional (or erected) configuration defines a carton, which is conveyed in such a manner as to have an opening arranged frontally to the products to be packaged, which are in turn conveyed so as to face the opening of a respective carton into which they have to be introduced. A mechanical element, such as for example a pusher, moves the product to the carton until the product enters the carton through the opening, which is subsequently closed.

Cartoning machines of known type are mainly divided into horizontal cartoning machines and vertical cartoning machines, depending on the orientation adopted by the carton in the conveying system, or in other words, depending on the direction of insertion of the products inside the cartons.

Horizontal cartoning machines, in which the cartons are arranged in a "lying-down" position, i.e. with a longitudinal axis thereof arranged horizontally, and the products are introduced into the respective cartons laterally along a horizontal direction, are generally more widespread because they enable greater productivity to be obtained, being able to package a greater number of packages per minute.

Nevertheless, in certain cases, it is necessary to use vertical cartoning machines, in which the cartons are arranged in an "erect" or vertical position, i.e. with the longitudinal axis thereof arranged vertically, and the products are inserted into the respective cartons from above along a vertical direction.

The vertical cartoning machines are typically used when several products have to be inserted into a single carton or when inserting products is difficult, for example because of the shape or of the material of which they are made.

One example of a vertical cartoning machine is disclosed by European patent EP 0989941.

One drawback of vertical cartoning machines is that they have more limited productivity than other packaging machines (for example, than horizontal cartoning machines) and are not able to package more than a set number of cartons per minute.

Further, vertical cartoning machines also have other drawbacks, which are linked to the manner of storing the blanks in the magazine.

In one embodiment, the blanks in the magazine are oriented in such a manner that the longitudinal axis thereof is arranged substantially parallel to a vertical axis. The blanks are then stored in an "erect", or substantially erect position. Thus the operating group removes the blank in an erect position, erects the blank increasing its volume and delivers the blank to the conveying system without rotating the longitudinal axis. In fact, in this embodiment, the blank in the magazine is already arranged vertically, like the carton in the conveying system.

In this way the operating group does not have to rotate the blank to modify the orientation of the longitudinal axis in space. The blank can thus maintain its substantially vertical longitudinal axis from when it is removed from the magazine (in the planar configuration) until when it is delivered (in the tridimensional configuration) to the conveying system. For example, the blank can be moved along a linear advancement path, or be rotated only around a vertical axis.

Accordingly, driving the operating group is simple and the cycle time thereof from the moment of removing the planar blank until the moment of delivery of the tridimensional blank is rather short.

Thus in this embodiment, the arrangement of the blanks in the magazine does not adversely affect the productivity of the vertical cartoning machine, which, as said previously, is already limited.

In this embodiment, however, the magazine has the drawback of making the control of the cartoning machine more complex as it is not possible to determine reliably the exact position of the blanks, as the blanks are arranged resting on a hinged bottom thereof, which is rotatingly movable around a corresponding hinge. For example, the blanks in the magazine can tilt by a certain angle with respect to the vertical direction. This can entail problems during the operation of removing of the blank. In fact, if the blanks are not exactly in the expected position, the operating group may remove the blanks in an incorrect manner, which may cause problems during erection of the blank when its volume is increased. In some cases, the operating group may also be unable to remove the blank, if the latter is oriented according to an arrangement that is different from the expected arrangement.

It is clear that these problems increase the number of cartons to be rejected, thus further lowering the productivity of the machine.

In order to attempt to overcome these problems, the magazine of the blanks thus has a complex and accordingly costly structure, in order to constrain effectively the blanks in the erect position, in such a manner that during the movement thereof into the magazine they maintain the expected position.

In another embodiment, the blanks in the magazine are so oriented that the longitudinal axis thereof is substantially parallel to a horizontal axis. The blanks are thus in a so-called "lying-down" or horizontal position. Thus, the operating group removes the blank in a lying-down position and, in addition to erecting the blank increasing its volume also has to rotate the blank 90° around a horizontal axis perpendicular to the longitudinal axis to deliver the blank to the conveying system in the erect position. In this embodiment, the blank is arranged in the magazine substantially lying down, for example on a horizontal plane, whilst in the conveying system downstream of the operating group the blank has to be arranged in a (vertical) erect position to enable the products to be inserted vertically from above into the subsequent insertion zone. The operating group thus has the function of erecting the blank increasing its volume, and modifying the orientation of the blank in space to convey the blank to the conveying system in a vertical position, i.e. with the longitudinal axis arranged vertically to enable products to be introduced into this type of vertical cartoning machine.

Unlike the embodiment disclosed previously, in this embodiment a side edge of the blanks rests in the magazine, adopting a more stable position than the blanks resting on the hinged bottom, as the side edge is more rigid than the hinged bottom. Consequently, in this embodiment, the magazine of the blanks has a simpler and less costly structure.

Nevertheless, this embodiment has the drawback of reducing significantly the productivity of the machine.

Driving the operating group has to in fact provide correct movement of the blank whilst the blank is being erected increasing its volume, to rotate the blank from the lying-down configuration to the vertical configuration. This complicates the operation of the operating group, which is also structurally more complex.

The elements of the operating group that retain the blank whilst it rotates, is erected increasing its volume and moved to the conveying system move certainly in a coordinated manner. As will be clear to the person skilled in the art, during the respective movement of the aforesaid elements, it may occur that two of these elements have mutually interfering paths. This generates downtime and waits of one or more of these elements, for example to await the transit of another element that hinders the path thereof.

For this reason, in this embodiment the operating group has a greater cycle time, and consequently the machine has lower productivity. It will be appreciated that this is a grave drawback as, as said, the productivity of vertical cartoning machines is already rather limited.

DE 1909119 shows a device for erecting cartons from a folded blank. The device comprises a magazine, in which the folded blanks are stored horizontally in a stack, and an inlet conveyor that removes in succession from the stack the lowest blank and transfers the blank below a conveying wheel, which is rotatable around a horizontal axis, which comprises a drum on which plates for gripping the blank are positioned. The conveying wheel moves the blank from the inlet conveyor, in which the blank is still in a planar configuration, to an outlet conveyor, in which the blank is in a tridimensional and vertical configuration. During conveying, the blank is erected increasing its volume and adopts the tridimensional configuration.

The presence of the inlet conveyor device, for supplying the blanks to the conveying wheel, makes the cartoning machine complex, bulky and costly.

U.S. Pat. No. 2,762,274 discloses a carton erecting apparatus in which a suction wheel receives folded blanks stored stacked horizontally in a magazine located above the wheel through feeder chains arranged at the exit of the magazine. The suction wheel unfolds the blanks into open cartons, flaps of which are subsequently glued and closed. The cartons having only one open side are then rotated along the line of travel to an upright position to be filled at the filling station.

One object of the present invention is to improve known cartoning machines, in particular the vertical cartoning machines.

Another object is to improve the productivity of known cartoning machines, i.e. the number of cartons packaged in the unit of time.

A further object is to make available an operating group for a cartoning machine that is very reliable and is not more reliable and complicated than known prior-art operating machines for removing a blank in a planar configuration and delivering an erected blank.

Still another object is to make available an operating group in which the gripping elements that retain the blank follow paths that do not interfere with one another, such as not to hinder one another.

BRIEF DESCRIPTION OF THE FIGURES

The invention can better understood and implemented with reference to the attached drawings that illustrate an embodiment thereof by way of non-limiting example, in which.

DETAILED DESCRIPTION

Figure 1:
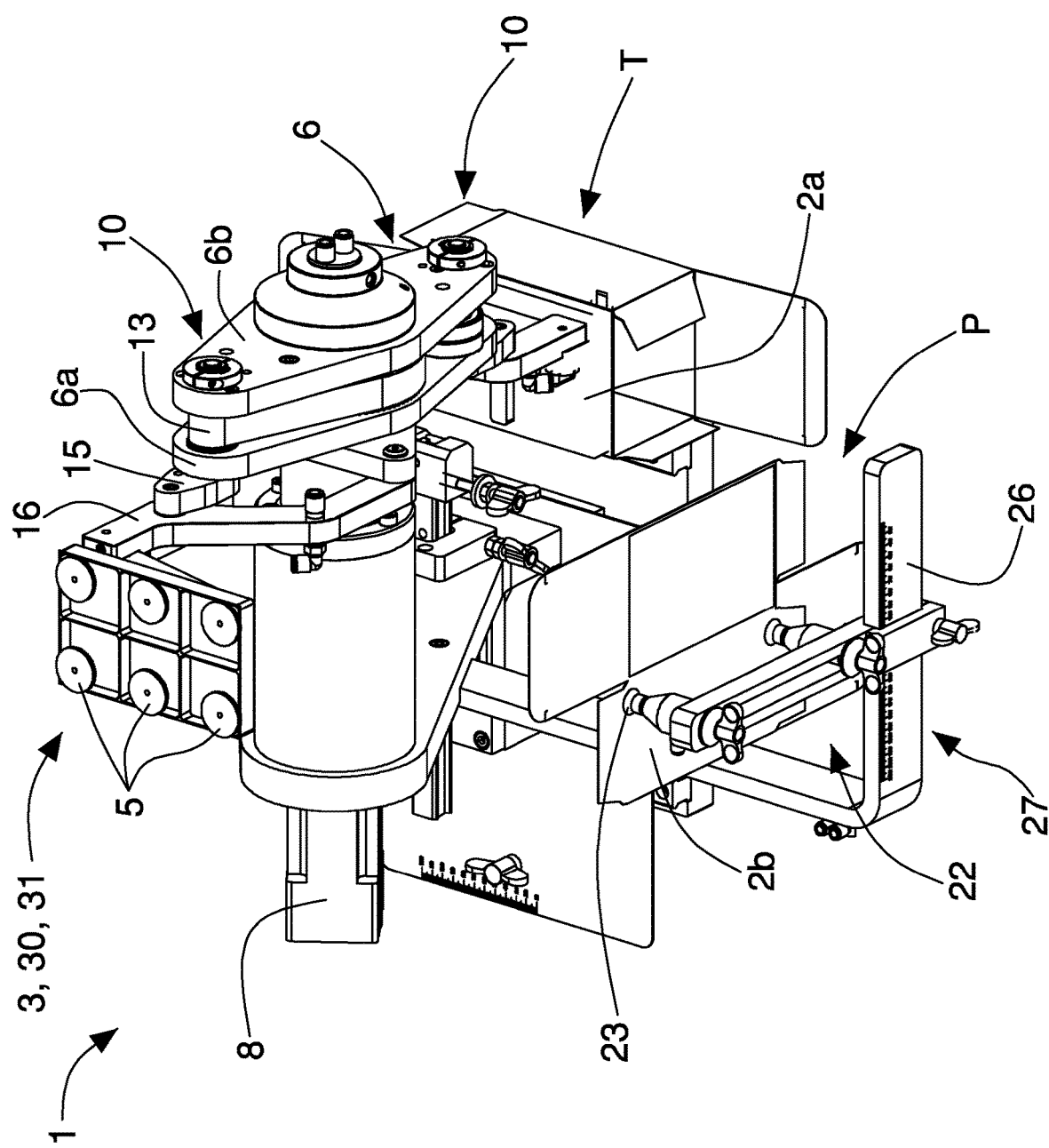
FIG. 1 is a partial and schematic perspective top view of the operating group according to the invention in which gripping arrangement for retaining a blank is shown in successive positions, the blank retained by the gripping arrangement being further visible in some positions.
Figure 2:
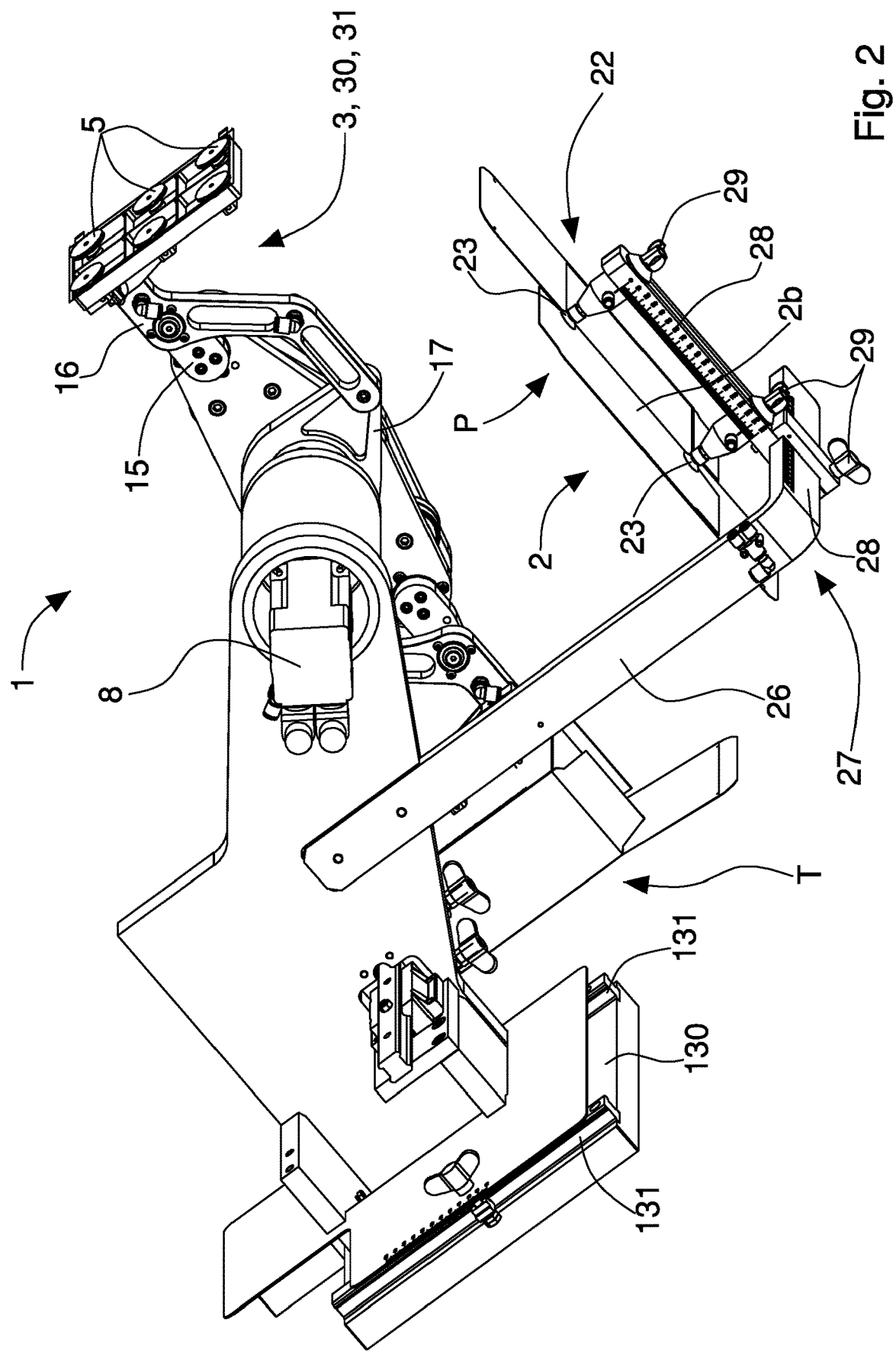
FIG. 2 is a perspective view of the operating group of FIG. 1, in which the operating group is shown according to another perspective.

With reference to the Figures, with 1 overall an operating group or supplying station is indicated, for a cartoning machine of the vertical type. In particular, the operating group 1 is arranged to move a blank, for example of the pre-glued type 2 that is intended to form a carton adapted to contain one or more products, such as for example vials, bottles, jars, or the like.

The operating group 1 comprises a magazine 51 suitable for housing a plurality of blanks 2 folded in a planar manner and gripping arrangement 3 that is configured for transferring the blanks 2.

The magazine 51 slidably houses the blanks 2 in a folded or flat planar configuration P. Further, the blanks are arranged in the magazine 51 in a "lying down" or horizontal position, i.e. with the longitudinal axis of prevalent extent arranged horizontally.

In detail, the gripping arrangement 3 is configured for retaining at least one blank 2 and is movable at least between a removing position W, in which the gripping arrangement 3 removes the blank 2 arranged in the magazine 51 in the folded planar configuration P, which is horizontal, and a delivery position D, in which the gripping arrangement 3 delivers the blank 2 arranged in a tridimensional unfolded configuration T, which is vertical with respect to the planar configuration. In other words, in this tridimensional unfolded configuration T, the longitudinal axis of the blank is arranged vertically.

The gripping arrangement 3 is rotated around a horizontal rotation axis X, along a closed loop transfer path.

In detail, the gripping arrangement 3 is configured for travelling a portion of the closed loop transfer path that is subtended by an angle of substantially 270° between the removing position W and the delivery position D, as we shall see below in greater detail.

The magazine 51 is shaped for housing the blanks 2 in a horizontal position in the removing position W and further the removing position W from the magazine is arranged above the closed loop transfer path, travelled by the gripping arrangement 3. In this manner, the gripping arrangement 3 can remove directly from the magazine 51 the blank 2 in the folded and horizontal planar configuration P.

The blanks 2 are arranged on a horizontal plane, at one outlet of the magazine 51, in the removing position W. In detail, the outlet of the magazine is arranged above the closed loop path.

The gripping arrangement 3 comprises a body 6 that is rotatable around the rotation axis X, one or two gripping elements 31 coupled with the body 6, and motion transmitting device 7.

Along the loop transfer path, the gripping elements 31 move between a position that is further from the rotation axis X to a position that is nearer the rotation axis X.

In detail, the gripping arrangement 3 comprises a gripping device 30 that comprises at least one gripping element 31. In the illustrated embodiment, the gripping device 30 comprises two gripping elements 31. In alternative embodiments that are not illustrated, the gripping device 30 can comprise three or more gripping elements 31.

Figure 4:
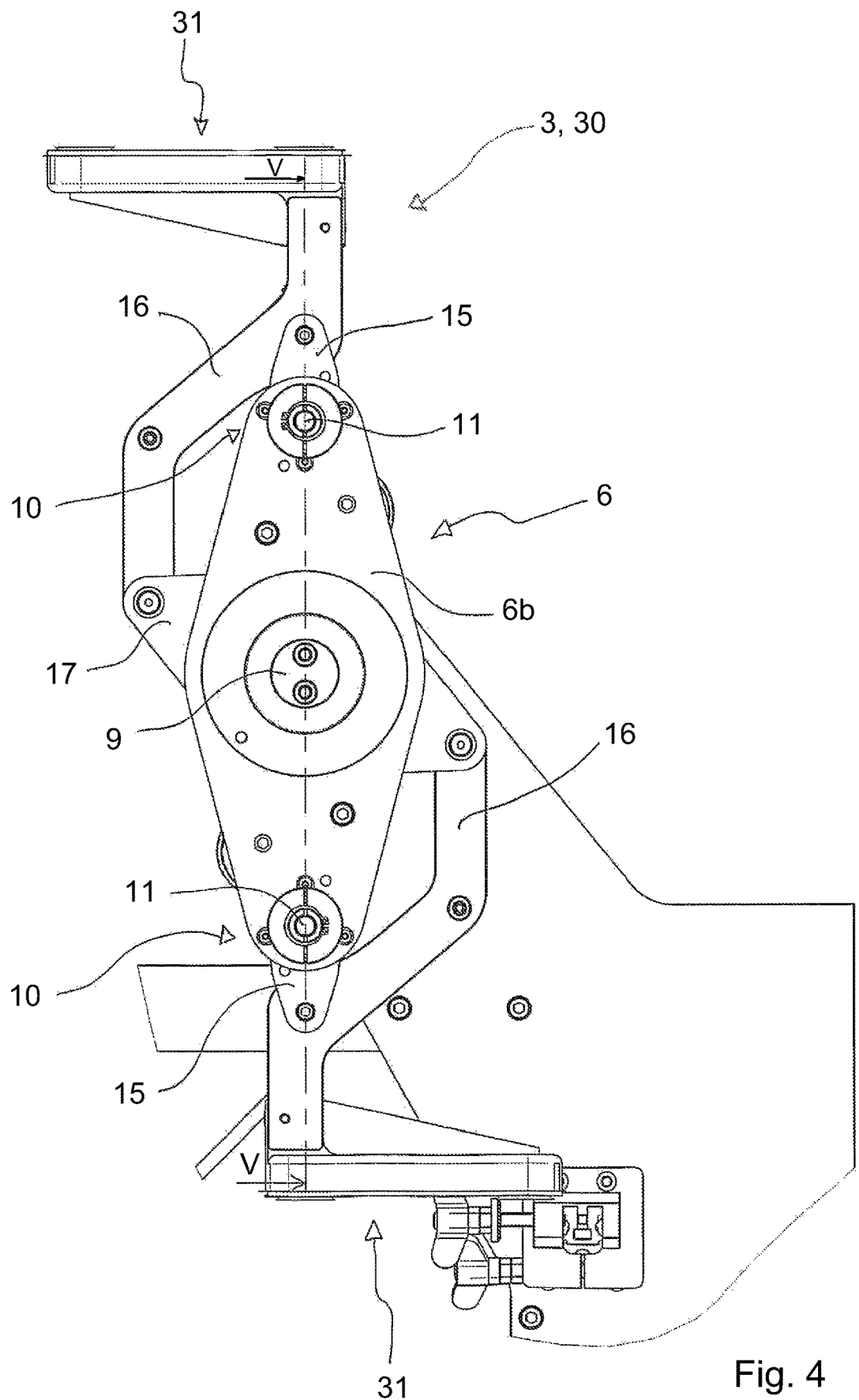
FIG. 4 is a partial and schematic side view of the operating group of FIG. 1.

The gripping elements 31 are equidistantly spaced apart from one another. For example, as is clearly visible in FIG. 4, the two gripping elements 31 are angularly spaced apart from one another by an angle substantially equal to 180°.

The gripping element 31 comprises a plate, for example of rectangular shape, provided with a plurality of suction cups 5. The suction cups 5 are in fluid communication with a suction system of known type. The suction cups 5 are suitable for retaining through a vacuum the blank 2 at a first gripping face 2a of the blank 2.

In the disclosed and illustrated embodiment, each gripping element 31 comprises six suction cups 5, arranged in adjacent rows. It is understood that in other embodiments that are not shown, each gripping element 31 can comprise a different number of suction cups 5, and/or the suction cups 5 can be arranged according to a different arrangement.

In addition, the operating group 1 comprises pushing device 4 that is configured for moving away the blanks 2 from the gripping arrangement 3 in the delivery position D.

The gripping elements 31 are movable between the removing position W, in which they remove from the magazine 51 the blank 2 in the horizontal planar configuration P, and the delivery position D, in which they deliver the blank 2 in the tridimensional unfolded and vertical configuration T to the pushing device 4.

Figure 3:
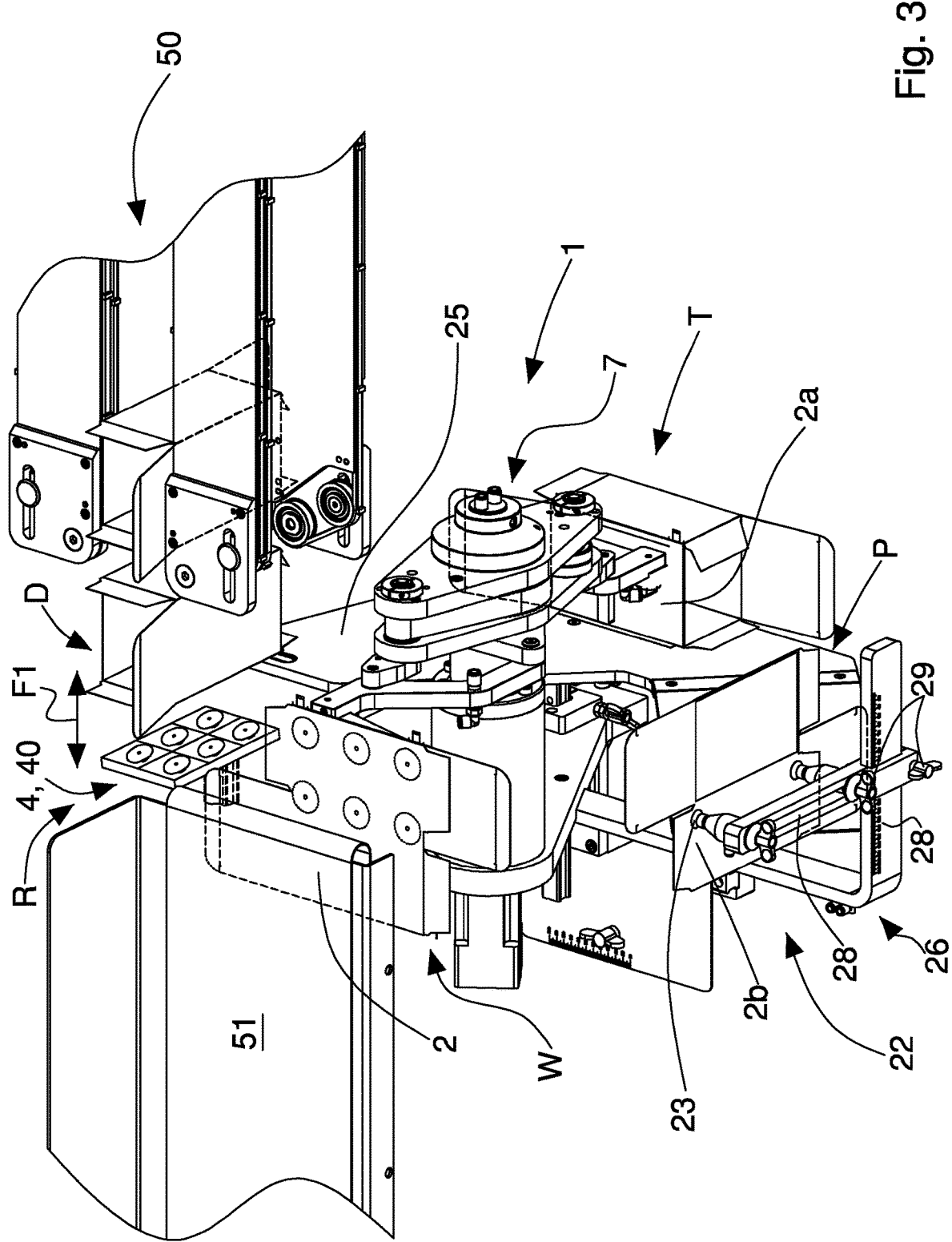
FIG. 3 is a partial and schematic perspective top view of the operating group of FIG. 1, and of portions of a cartoning machine associated with the operating group, in which a sequence of positions is further shown that are adopted by a blank retained by the gripping arrangement.

The removing W and delivery D positions are visible in FIG. 3, in which also the blank 2 is shown, in both positions, respectively in the horizontal planar configuration P and tridimensional unfolded vertical configuration T.

The pushing device 4 comprises a pusher device 40 arranged for receiving from the gripping arrangement 3, in particular from the gripping elements 31, the blank 2 in the tridimensional unfolded and vertical configuration T when the gripping elements 31 reach the delivery position D. The pusher device 40 is further arranged for retaining and pushing the blank 2 away from the gripping elements 31, in particular to push the blank 2 towards and deliver the blank 2 to a conveying system 50 of the cartoning machine, one portion of which is visible in FIG. 3. The pusher device 40 is thus movable between a retracted position R (shown in FIG. 3) in which the pusher device 40 receives the blank 2 (in the vertical tridimensional configuration T) from the gripping element 31 that has reached the delivery position D, and an advanced position (not shown) in which the pusher device 40 delivers the blank 2 to the conveying system 50. The pusher device 40 is movable according to an insertion path along an inserting direction with reciprocating motion between the retracted position R and the advanced position, as indicated by the arrow F1 in FIG. 3. The inserting direction is rectilinear.

According to one embodiment, the pusher device 40 is suitable for retaining the blank 2 at a second gripping face and comprises a pusher that bears one or more suction cups, which are completely similar to the suction cups 5 of the gripping elements 31. The second gripping face is adjacent to the first gripping face 2a.

The conveying system 50 of the cartoning machine of the vertical type is of known type and can comprise a plurality of toothed belts. For example, the conveying system 50 can comprise at least two toothed belts, arranged so as define therebetween an advancement path of the blanks, in particular according to a rectilinear advancement direction. Each toothed belt comprises a plurality of ridges, which are equidistant from one another by a distance (step) that is substantially equal to, or greater than the extent of the blank in the advancement direction. The ridges are arranged to contact an edge of the blank 2. In this manner, the blank 2 is retained by the thrust that the toothed belts exert on the blank 2 on opposite sides, in cooperation with the action of the aforesaid ridges.

Figure 5:
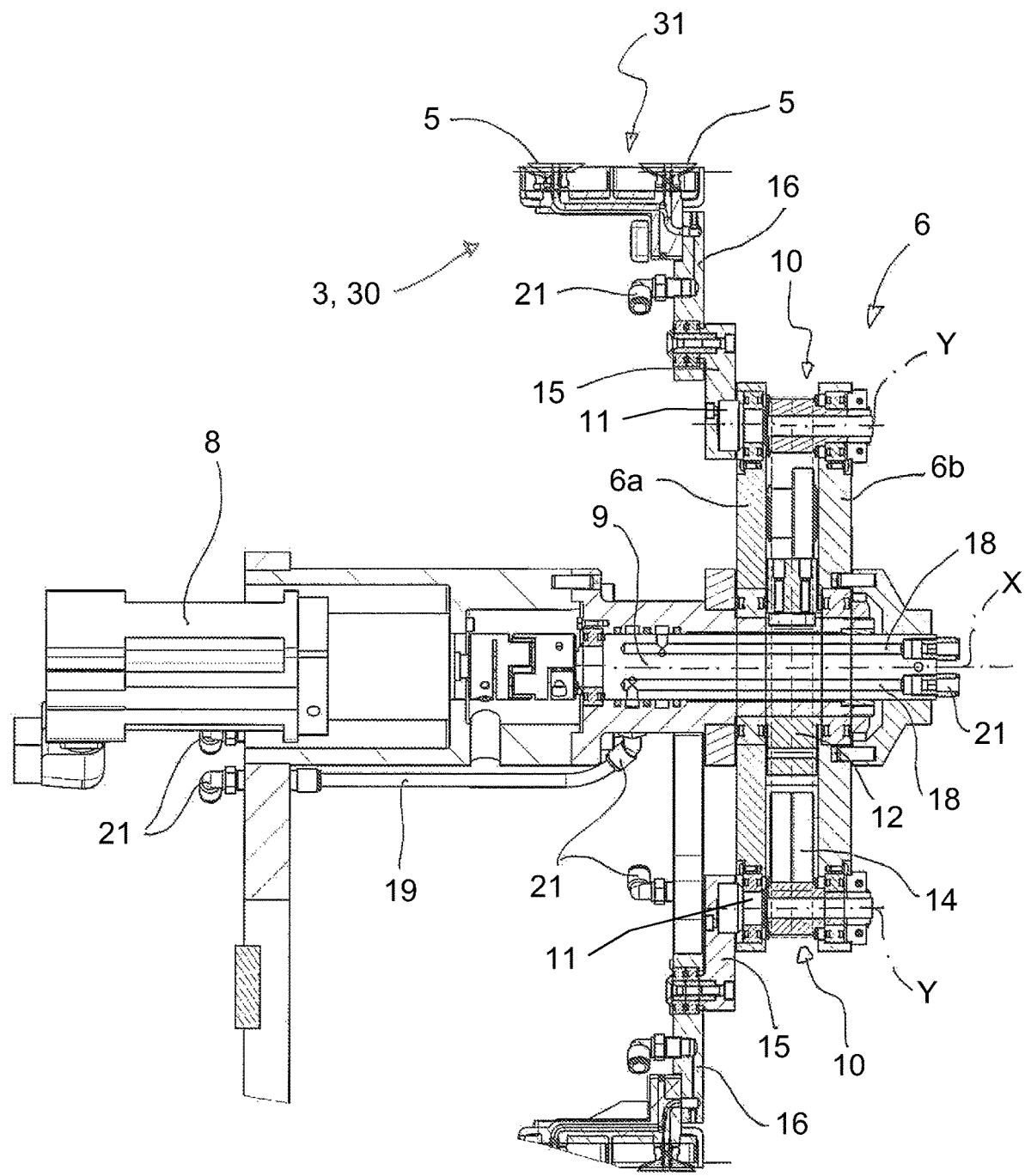
FIG. 5 is a section view of the operating group according to the invention taken according to the plane V-V of FIG. 4.

The gripping elements 31 are rotated around a horizontal rotation axis X (visible in FIG. 5) such as to travel the loop transfer path that does not interfere with the insertion path of the pusher device 40.

In other words, the gripping elements 31 are rotated along a transfer path that does not intersect the insertion path of the pusher device 40. In substance, the respective paths of the gripping devices 31 and of the pusher device 40 do not interfere with one another as none of them hinders the movement of the other during operation.

The loop transfer path of the gripping elements 3 can, for example, be substantially configured as a circumference. It should be noted that during movement of the gripping elements 3 from the removing position W to the delivery position D, the first gripping face 2a of the blank 2, at which the latter is retained by the gripping elements 3, is arranged to as to be substantially tangential to the loop transfer path.

The removing position W of the blank 2, at the outlet of the magazine 51, is placed above the loop transfer path, such that the gripping arrangement 3 can remove the blank 2 directly from the magazine 51.

It is pointed out that the terms "above" and "below", "top" and "bottom" refer to a vertical axis.

Also, the rotation axis X is parallel to the inserting direction.

The motion transmitting device 7, associated with the body 6, is configured for transmitting motion to the gripping elements 31.

The motion transmitting device 7 can comprise a motion transmitting group 70 suitable for moving the gripping elements 31 at least between the removing W and delivery D positions. According to the illustrated embodiment, the motion transmitting group 70 comprises epicyclic gearing, or similar gearing. Alternatively, or additionally, the motion transmitting group 70 can comprise cam mechanisms or levers that are suitable for moving the gripping elements 31 at least between the removing W and delivery D positions.

The body 6 comprises a first plate 6a and a second plate 6b, for example having the same shape. The plates 6a, 6b are joined together by a mechanical connection so as to rotate integrally with one another. The mechanical connection can for example comprise pulleys 10 rotatably connected to the first plate 6a and to the second plate 6b. In other words, each pulley 10 rotates with respect to the plates 6a, 6b. Each pulley 10 is free to rotate around a secondary axis of rotation Y. The latter is an axis of symmetry of a rotation shaft 11 on which the pulley 10 is mounted.

The motion transmitting group 70 can comprise a drive group 8 that rotates the rotation axis X around a main shaft 9. In the illustrated embodiment, the rotation axis X is an axis of symmetry of the main shaft 9.

The plates 6a and 6b are fixed to the main shaft 9, such that the rotation of the latter causes the plates 6a, 6b (and thus the body 6) to rotate around the rotation axis X.

In the illustrated embodiment, the motion transmitting group 70 comprises a gear wheel 12 that is fixed to the main shaft 9 and rotated by the latter.

In the illustrated embodiment, the motion transmitting group 70 further comprises a belt 13, for example a toothed belt of known type, that is arranged to engage the gear wheel 12.

The belt 13 surrounds the pulleys 10 to rotate the latter around the secondary axis of rotation Y.

The motion transmitting group 70 further comprises tensioning rollers 14 arranged to maintain in tension the belt 13 in cooperation with the pulleys 10 and the gear wheel 12. The tensioning rollers 14 are rotatably connected to the plates 6a, 6b. The tensioning rollers 14, which are idle rollers rotated by the belt 13, rotate with respect to the plates 6a, 6b.

Figure 6:
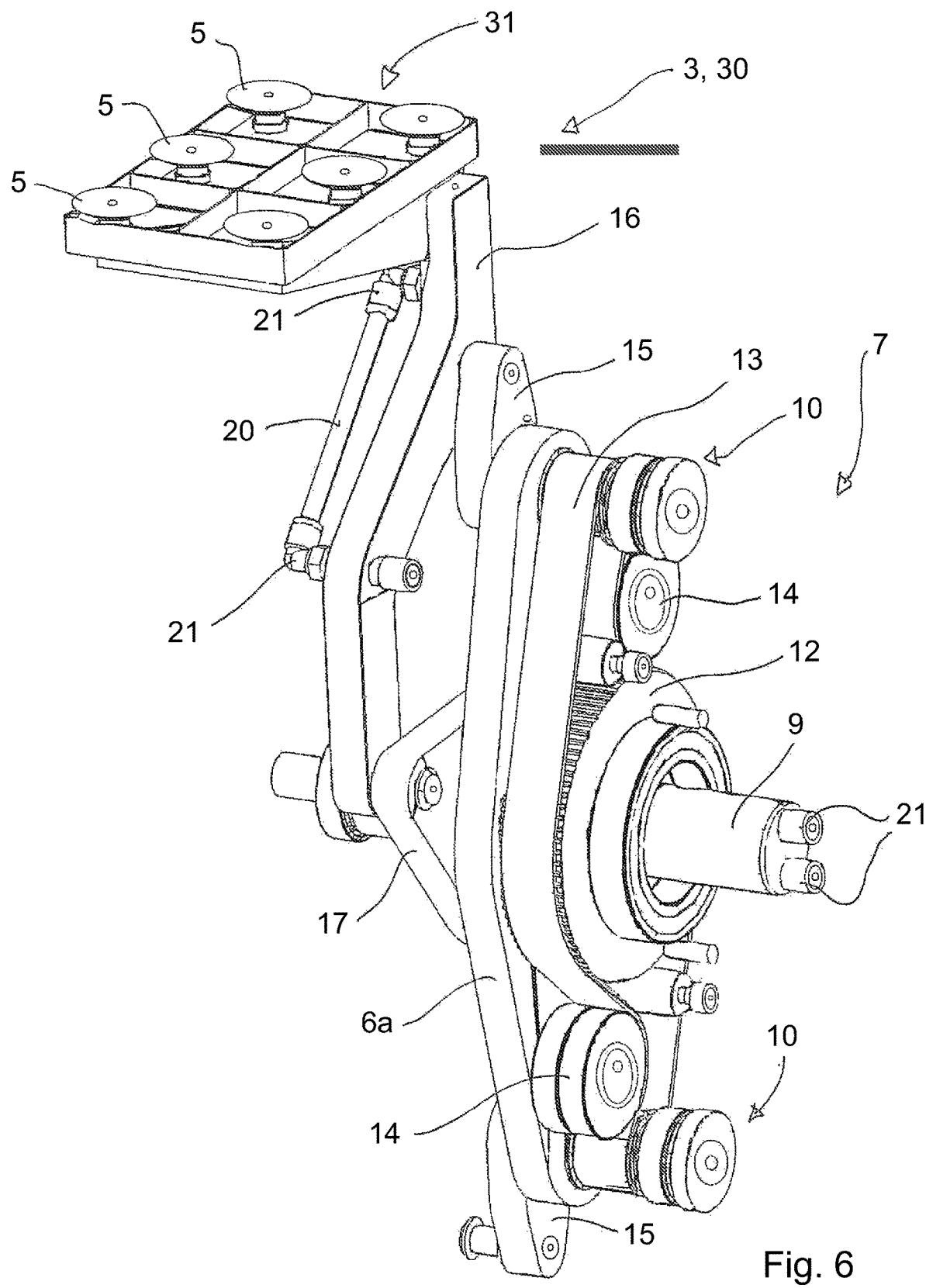
FIG. 6 is an enlarged perspective view of a portion comprised in the operating group of FIG. 1, in which some parts have been removed to highlight others better.

The pulleys 10, the gear wheel 12, the belt 13 and the tensioning rollers 14 are visible in the enlargement of FIG. 6, where the second plate 6b has been removed in order to show the elements listed above, which are positioned between the plates 6a, 6b.

The motion transmitting group 70 comprises at least one crank 15. The gripping elements 31 are connected to the body 6 by means of a respective crank 15. In particular, the crank 15 connects the first plate 6a and the second plate 6b to an arm 16 to which the gripping element 3 is fixed. The crank 15 is rotatable around the secondary axis of rotation Y. The crank 15 is fixed to the rotation shaft 11 and rotates together with the latter, which, rotating around the secondary axis of rotation Y, rotates the crank 15 around this same axis. As the pulleys 10 are rotatably connected to the plates 6a, 6b that form the body 6, and the latter is rotatable around the rotation axis X, it is clear that the secondary axis of rotation Y (i.e. the axis of the rotation shaft 11) is movable along a circumferential path around the axis X.

The crank 15 is rotatably connected to the arm 16. In this manner, although the crank 15 rotates in relation to the arm 16, the crank 15 is able to transmit the rotation movement of the body 6 to the arm 16, and thus to the gripping element 3. Consequently, the gripping elements 31 (and the arm 16) rotate around the axis X.

Further, owing to the presence of the crank 15, the gripping arrangement 3 moves along the closed loop path between a position that is further from the rotation axis X and a position that is nearer the rotation axis X.

As will be obvious to the person skilled in the art, interposing the crank 15 between the arm 16 and the body 6 results in the arm 16 and the gripping elements 31 adopting the aforesaid positions that are further from and nearer the rotation axis X when the crank reaches its opposite dead centre positions. In a first dead centre position, visible in the Figures, the crank 15 protrudes outside the plates 6a, 6b, extending radially outside the body 6. When the crank 15 is in the first dead centre position, the gripping element 3 is in the position that is further from the axis X. In a second dead centre position, which is not shown, the crank 15 is completely superimposed on the plates 6a, 6b and does not thus protrude outside the latter. When the crank 15 is in this second dead centre position, the gripping element 31 is in the position that is nearer the axis X.

The crank 15 is in the first dead centre position at least when the gripping element 31 is in the removing position W and in the delivery position D. Further, the crank 15 is in the first dead centre position even when the gripping element 31 is in a position, which will be disclosed in greater detail below, which faces a main unfolding device comprised in the operating group 1.

The crank 15 returns to the first dead centre position when the gripping element 31 has travelled a portion of the transfer path that is subtended by an angle of substantially 90°. In other words, whilst the gripping element 31 completes the transfer path, i.e. a complete revolution of 360° around the rotation axis X, the crank 15 rotates around the secondary axis of rotation Y so as to perform four complete rotations.

The first dead centre positions adopted by the crank 15 in a complete revolution of the body 6 around the rotation axis X can, all, or in part, correspond to operating stations or functional points of the operating group, at each of which an operation can be performed on the blank 2. In the illustrated embodiment, at three of the four first dead centre positions adopted by the crank in a 360; rotation of the body 6 operations are performed on the blank 2, in the following order: removing, unfolding (or erection) and delivery.

We have said that the blank 2 is removed folded and horizontal directly from the magazine 51, the outlet of which is arranged above the closed loop transfer path.

Taking as a reference the removing position W, the unfolding and delivery operation (or station) are arranged at 90° and 270°, respectively. In the illustrated embodiment, still with reference to the removing position W, at the first dead centre position arranged at 180° no operations are performed on the blank. In alternative embodiments that are not illustrated, even the first dead centre position arranged at 180° can be used to arrange an operating station and perform an operation on the blank 2.

The arm 16 is further connected to a guided element 17, or rocker arm, which is fitted rotatably (in an idling manner) to the main shaft 9. The guided element 17 rotates around the rotation axis X and is rotated by the arm 16.

It is understood that the motion transmitting group 70 disclosed previously is only a non-limiting embodiment. For example, the motion transmitting group 70 can comprise elements other than those disclosed above but be functionally equivalent thereto to transmit rotation from the main shaft 9 to the gripping elements 3.

For example, a motion transmitting group can be provided that, for each complete rotation of the gripping element 31 around the rotation axis X, provides for the crank 15 adopting more or fewer than four first dead centre positions, arranged according to angles different from 90° along the transfer path that the gripping element 31 travels.

The operating group 1 further comprises a suction system connected to the suction cups 5. As is more clearly visible in FIGS. 5 and 6, the suction system—of known type—comprises conduits 18 made inside the main shaft, flexible pipes 19, rigid pipes 20 and a plurality of pneumatic connectors 21 arranged to connect together the aforesaid conduits and/or pipes and generate a vacuum at the suction cups 5.

The operating group 1 comprises a main unfolding device 22 (FIGS. 1-3 and 7) arranged to cooperate with the gripping elements 31 to take the blank 2 from the folded planar configuration P to the tridimensional unfolded configuration T.

The main unfolding device 22 and the gripping elements 31 are movable in relation to one another such that the corresponding movement therebetween enables the blank 2 to be moved from the folded planar configuration P to the tridimensional unfolded configuration T. In particular, in this embodiment, the main unfolding device 22 are fixed, whilst, as said previously, the gripping elements 31 are movable along the closed loop transfer path.

In addition, the main unfolding device 22 is suitable for retaining through a vacuum a third gripping face 2b of the blank 2, to cooperate with the gripping elements 31 to take the blank 2 from the folded planar configuration P to the tridimensional unfolded configuration T.

The main unfolding device 22 comprises one or more suction cups 23, for example of the type similar to the suction cups 5 of the gripping elements 31.

The suction system connected to the suction cups 5 of the gripping elements 31 is also connected to the suction cups 23 of the main unfolding device 22 and is driven to operate the suction cups 5 and the suction cups 23 in a mutually coordinated step, as illustrated in greater detail below.

The suction cups 23 of the main unfolding device 22 are suitable for retaining through a vacuum the third gripping face 2b of the blank 2.

The third gripping face 2b, when the blank 2 is in the planar configuration P, is on the side opposite the first gripping face 2a and adjacent to the second gripping face.

In use, the gripping elements 31 take the blank 2 to near the main unfolding device 22. In particular, the gripping elements 3 face the main unfolding device 22 when the crank 15 is in the first dead centre position, i.e. after travelling a portion of the transfer path (starting from the removing position W) subtended by an angle of approximately 90°.

The main unfolding device 22 contacts and retains through a vacuum the third gripping face 2b owing to the suction cups 23. In this manner, the gripping elements 31 and the main unfolding device 22 simultaneously retain the blank 2 that is folded and planar 2 on opposite sides, respectively at the first gripping face 2a and at the third gripping face 2b of the blank 2. In an alternative embodiment that is not shown, instead of, or additionally to, the suction cups 23, the main unfolding device 22 can comprise gripping devices of mechanical type, such as grippers, suitable for retaining the third gripping face 2b.

The gripping elements 31, continuing the movement along the transfer path, move away from the main unfolding device 22. The corresponding movement between the gripping elements 31 and the main unfolding device 22, in particular the moving away of the first with respect to the latter, causes the deformation (erection) of the blank 2. As the gripping elements 3 move away from the main unfolding device 22, the blank 2 leaves the flat, planar or folded configuration P to adopt first a configuration in which the blank 2 has a cross section that is substantially rhombus-shaped, and lastly reaches the tridimensional configuration T.

The main unfolding device 22 acts as an abutting element as it is configured for retaining in a fixed position the third gripping face 2b of the blank 2 for a certain period of time. The duration of this period of time depends on the activation of the suction system and is set in a set-up of the operating group 1. This duration must be appropriate to ensuring that on the one hand the gripping elements 31 are moved away sufficiently to deform the blank 2 permanently, and on the other hand, that the gripping elements 3 are not moved away too far from the main unfolding device 22 in order to prevent the blank 2 being torn.

In fact, on the one hand, if the main unfolding device 22 releases the grip on the third gripping face 2b too soon, i.e. if the gripping elements 3 have not moved away sufficiently from the main unfolding device 22, the blank 2 has not been deformed by a sufficient quantity and must accordingly become flat again and return to the planar configuration P. In particular, the gripping elements 3 have to move away by an amount that is such as to cause a suitable yield of the material with which the blank 2 is made, which is typically card.

On the other hand, it is clear that if the main unfolding device 22 releases the grip on the third gripping face 2b too late, i.e. when the gripping arrangement 3 have moved away too far from the main unfolding device 22, the blank 2 is subjected to opposite retaining forces that may cause cuts or tears of the card.

The operating group 1 further comprises an auxiliary unfolding member 24 that is configured for assisting the main unfolding device 22 to take the blank 2 from the planar configuration P to the tridimensional unfolded configuration T.

Figure 7:
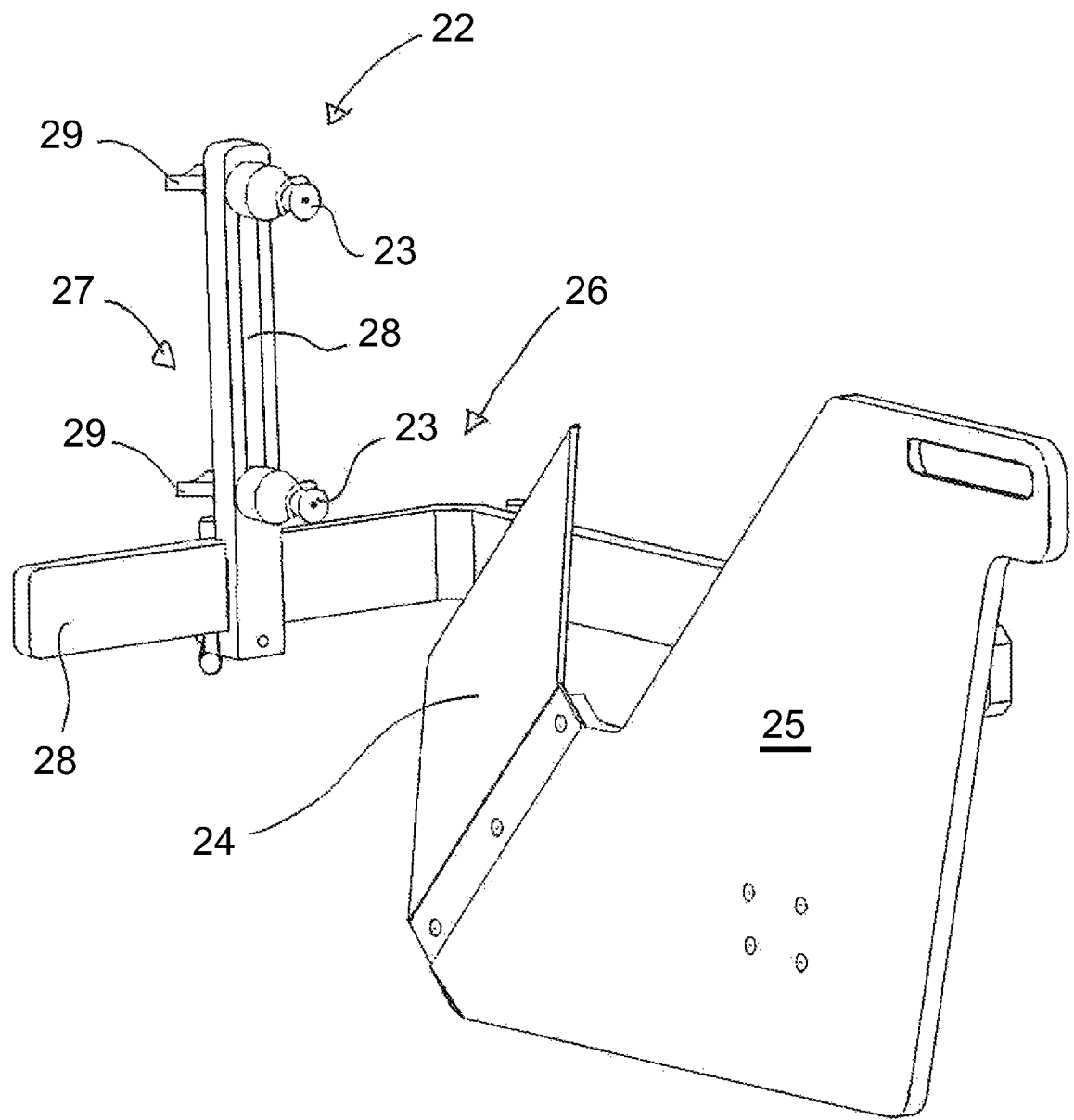
FIG. 7 is a perspective view of an unfolding device included in the operating group of FIG. 1.

As shown in FIG. 7, the auxiliary unfolding member 24 is configured as a laminar element fixed to a frame 25 of the operating group 1. The laminar element is oriented in space according to a set tilt, such that the laminar element contacts the blank 2 laterally that is moving away from the main unfolding device 22 so as to accompany the movement of the blank 2 during the transit from the planar configuration P to the tridimensional configuration T. In other words, the laminar element contacts the blank 2 laterally during the corresponding reciprocal movement of the main unfolding device 22 and of the gripping elements 31 from the planar configuration P to the tridimensional unfolded configuration T.

The auxiliary unfolding member 24, that is fixed, is arranged according to an arrangement that is such as to facilitate the deformation of the blank 2 from the planar configuration P to the tridimensional unfolded configuration T and to hinder the undesired return of the blank 2 to the planar configuration P.

The main unfolding device 22 is fixed to a fixed support structure 26, with which adjusting devices 27 are associated that are arranged to adjust the position of the main unfolding device 22. The adjusting devices 27 comprise, for example, linear guides 28 that enable the position of the suction cups 23 along a vertical direction and a horizontal direction to be adjusted. Each linear guide 28 can be provided with a graduated scale for facilitating precise adjustment of the position of the suction cups 23 by the operator.

The adjusting devices 27 can comprise fixing knobs 29, by means of which, by manual clamping, the operator can fix the suction cups 23 in the desired position.

The operating group 1 is mounted on a base 130 (FIG. 2) provided with linear guides 131 that enable the position of the operating group 1 to be adjusted.

The operating group 1 can be associated with a packaging machine and operate as a carton supplying station. In particular, the operating group 1 can be associated with a cartoning machine of the vertical type for packaging one or more products in a carton formed from the blank 2.

In addition to the operating group 1, the cartoning machine comprises the conveying system 50, which is arranged to move the blank 2 away from the operating group 1, an inserting station for inserting the products inside the respective cartons, a closing station for closing the carton, and an outlet station.

Below, the operation of an operating group 1 is disclosed when the operating group 1 is associated with a vertical cartoning machine.

In use, the work cycle of the operating group 1 starts when a gripping element 31 of the gripping device 30 is in the removing position W.

In this position, the suction cups 5 of the gripping element 31 contact the first gripping face 2a of the blank 2, which lies folded in a planar manner, with the longitudinal axis thereof arranged horizontally, at the bottom of a stack of blanks stored in the magazine 51 of the cartoning machine. The first gripping face 2a of the blank 2 is the face facing downwards.

In the magazine 51, the blanks 2 are stored in the folded or flat planar configuration P and at least at the removing position W, are arranged horizontally.

In the removing position W, the suction system is activated so that the suction cups 5 of the gripping element 31 can retain the blank 2 by suction.

It should be noted that in the removing position W, the gripping element 31 dwells for a short interval of time. The dwell of the gripping element 31 is due to the fact that in this position the crank 15 is in the first dead centre position, at which, further, the gripping element 31 is in the more distant position from the rotation axis X.

In other words, in the removing position W, the gripping element 31 is in the most distant position from the rotation axis X, is above the rotation axis X and is further below the outlet of the magazine 51.

This dwell gives the gripping element 31 the time required to remove the blank 2 from the magazine 51 and retain the blank 2 securely.

Subsequently, the rotation of the body 6 rotates around the (horizontal) rotation axis X the gripping element 31 together with the blank 2 that has just been removed. The gripping element 31, after travelling a portion of the transfer path subtended by an angle of approximately 90°, reaches near the main unfolding device 22.

The gripping element 31 is in the position nearest the main unfolding device 22 when the crank 15 returns to the first dead centre position after performing a complete rotation around the secondary axis of rotation Y.

In this position, the suction cups 23 of the main unfolding device 22 contact and are able to retain by suction the third gripping face 2b of the blank.

As the rotation of the body 6 continues, the gripping element 31 moves away from the main unfolding device 22. As explained previously, the corresponding movement between the gripping element 31 and main unfolding device 22 enables the blank 2 to be erected increasing its volume, with the cooperation of the auxiliary unfolding member 24.

After a subsequent portion of the transfer path, the gripping element 31 reaches in a rotated position around the rotation axis X by approximately 180° with respect to the removing position W. In the position rotated by 180°, the blank 2, which is still retained by a vacuum by the gripping element 31 at the first gripping face 2a, is in the tridimensional unfolded configuration T in which it is configured as a cardboard sleeve that is open at the ends.

It should be noted that the main unfolding device 22 and the auxiliary unfolding member 24 enable the blank to be taken from the folded and planar configuration P to the tridimensional unfolded configuration T in a short portion of the transfer path, subtended by an angle of approximately 90°.

After a further rotation, the gripping element 31 reaches the delivery position D. In the delivery position D the gripping element 3 has rotated around the rotation axis X by approximately 27° with respect to the removing position W. In the delivery position D the gripping element 3 dwells for a short period of time because of the fact that the crank 15 is in the first dead centre position.

During the dwell, the gripping element 31 delivers the blank 2 in the tridimensional unfolded configuration T, vertically, to the pusher device 40, which is waiting in the retracted position R. The suction system is driven to deactivate sucking of the suction cups 5 of the gripping element 31 once the pusher device 40 is already retaining by suction the second blank 2 gripping face.

The pusher device 40 moves along the inserting direction (indicated by the arrow F1 in Figure), parallel to the rotation axis X, to reach the advanced position, in which they deliver the blank 2 to the conveying system 50 of the cartoning machine. Afterwards, the pusher device 40 retracts to adopt again the retracted position R. In substance, the pusher device 40 moves with a reciprocating motion between the retracted position R, waiting to receive the next blank from the gripping element 3, and the advanced position, in which it delivers the blank to the conveying system 50.

After delivering the blank 2 to the pusher device 4, the gripping element 3 continues to move along the transfer path and returns to the removing position W. Here, it removes another blank 2 and starts another work cycle, the same as the one that has just been disclosed.

The operating group 1 according to the invention increases the productivity of the cartoning machine with which the operating group is associated.

This is due to the fact that, unlike known prior-art solutions, the gripping element 31 does not have to remain stationary waiting for the pusher device 40 to deliver the blank 2 to the conveying system 50.

In fact, in the operating group 1 according to the invention the gripping element 31, immediately after delivering the blank 2, continues along the transfer path to the removing position W to remove another blank whilst the pusher device 40 moves from the retracted position R to the advanced position.

The method of forming a tridimensional carton thus involves the steps of:

setting up a magazine 51 suitable for housing a plurality of blanks 2 folded in a planar manner;

removing a blank 2 arranged in the magazine 51 in a horizontal folded planar configuration P, when the blank 2 is in a removing position W;

moving the blank between the removing position W and a delivery position D along a closed loop transfer path;

delivering the blank 2, in the delivery position D, arranged in a tridimensional unfolded configuration T, which is vertical with respect to the planar configuration;

setting up the magazine 51 in such a manner as to house the blanks 2 in a horizontal position at a removing position W;

arranging the removing position W from the magazine 51 above the closed loop transfer path so as to remove the blank 2 directly from the magazine 51, in the horizontal folded planar configuration P.

Owing to the arrangement of the magazine blanks 51, such that the removing position W; in particular the outlet of the magazine 51, is placed entirely above the closed loop transfer path, the gripping elements 3 can remove directly from the magazine 51 the blank 2 placed lower in the stack, which is fed by gravity to the outlet of the magazine 51 where the removing position W is located.

Accessory transfer device are therefore not necessary to supply the blanks from the magazine blanks 51 to the gripping arrangement 3, which simplifies the operating group 1 and the cartoning machine.

Owing to the rotation by 270° of the gripping element 31 from the removing position W to the delivery position D, the blank is removed directly from the magazine 51 folded in a planar and horizontal manner and is delivered to the tridimensional unfolded configuration T but arranged vertically, as required in a vertical cartoning machine.

Owing to the fact that the transfer path of the gripping element 31 does not interfere with the insertion path of the pusher device 40, the latter and the gripping element 31 do not hinder one another and consequently they do not have compulsory dwell times, which significantly reduce the productivity of the machine.

Further, as operating group 1 can comprise one or two gripping elements 31, it is clear that the productivity of the machine increases in a manner that is proportional to the number of gripping elements 31. For example, with two gripping elements 31 spaced apart equidistantly by an angle of 180° from one another productivity doubles, or with three gripping elements 31 spaced apart equidistantly by an angle of 120° from one another, productivity triples.

It should be noted that in the operating group according to the invention the gripping device 30 can comprise a plurality of gripping elements 31, without this entailing a significant increase in the structural complexity of the group.

Furthermore the operating group 1 is very reliable. This is due to the fact that the gripping elements 31, owing to the presence of the crank 15, reach the positions of removing W and delivery D and the position nearest the main unfolding device 22 with great precision. Further, the presence of the crank 15 enables the gripping elements 31 to dwell for a short period of time in each of the mentioned positions, which facilitates operations (removing, erecting the blank increasing it, volume and delivery of the blank) that the gripping elements 3 have to perform in each of these positions.

The operating group 1 according to the invention has a simple and rather compact structure.

In addition the operating group 1 is very flexible because it enables the operator to adjust with facility both the position of the group itself (owing to the guides 131), and to adjust the position of the main unfolding device 22 owing to the adjusting device 27.

By virtue of the operating group according to the invention, it is clear that a cartoning machine of the vertical type comprising an operating group 1 according to the invention has greater productivity than known vertical cartoning machines.

The operating group 1 comprises rather a cheap blanks magazine having a simple structure in which the blanks are stored lying horizontally in a stack, as in horizontal cartoning machines.

The invention claimed is:

1. An operating group for a cartoning machine of the vertical type arranged for moving a blank adapted to form a carton for containing one or more products, said operating group including:
   a) a magazine for housing a plurality of blanks folded in a planar manner and for feeding a folded blank of said plurality of blanks along a folded blank feeding direction;
   b) gripping arrangement that is configured for retaining a blank and is movable at least between a removing position, in which said gripping arrangement removes said blank arranged in the magazine in a folded planar configuration, which is horizontal, and a delivery position, in which said gripping arrangement delivers said blank arranged in a tridimensional unfolded configuration, which is vertical to said planar configuration;
   c) said gripping arrangement being rotated around a horizontal rotation axis along a closed loop transfer path;
   d) wherein the magazine is shaped for housing said blanks in a horizontal position at the removing position; and
   e) the removing position from said magazine being arranged above the closed loop transfer path travelled by the gripping arrangement, such that the gripping arrangement can remove directly from the magazine said blank in the horizontal folded planar configuration;
   wherein said gripping arrangement is configured for travelling a portion of said closed loop transfer path subtended by an angle of substantially 270° between the removing position and the delivery position; and
   wherein said folded blank feeding direction of said magazine, said rotation axis of said gripping arrangement, and an advancement direction of said blank arranged in said tridimensional unfolded configuration are parallel to each other,
   said advancement direction being defined by a conveying system of a packaging machine that moves said blank away from said operating group.

2. The operating group according to claim 1, wherein the magazine has an outlet, at which the blank is arranged on a horizontal plane in said removing position, said outlet being arranged above the loop transfer path.

3. The operating group according to claim 1, wherein said gripping arrangement comprises a body that is rotatable around said horizontal rotation axis, one or two gripping elements coupled with said body, and motion transmitting device.

4. The operating group according to claim 3, wherein said one or two gripping elements, along the closed loop transfer path, are movable between a position that is further from said horizontal rotation axis and a position that is nearer said rotation axis.

5. The operating group according to claim 3, wherein said motion transmitting device comprises epicyclic gearing, is associated with the body and can transmit motion to said one or two gripping elements.

6. The operating group according to claim 3, wherein said motion transmitting device comprises, for each of said one or two gripping elements, a crank that connects said one or two gripping elements to said body and is rotatable about a secondary axis of rotation, the latter being arranged parallel to said horizontal rotation axis.

7. The operating group according to claim 6, wherein said crank is in a first dead centre position at least when said gripping elements are in said removing position and in said delivery position, said crank returning to said first dead centre position when said gripping elements have travelled a portion of said transfer path subtended by an angle of substantially 90°.

8. The operating group according to claim 1, further including a pushing device arranged for receiving from said gripping arrangement said blank in said tridimensional and vertical configuration when said gripping arrangement reaches said delivery position, and to retain and push said blank away said gripping arrangement, said pushing device being movable along an insertion path.

9. The operating group according to claim 8, wherein said pushing device further includes a pusher device that is movable between a retracted position, in which said pusher device is arranged to receive said blank in the vertical tridimensional configuration from said gripping elements in said delivery position, and an advanced position, in which said pusher device is arranged to deliver said blank to said conveying system, said pusher device being movable with reciprocating motion between said retracted position and said advanced position along said insertion path.

10. The operating group according to claim 9, wherein said pusher device is configured to retain the blank at a second gripping face, adjacent to a first gripping face.

11. The operating group according to claim 1, further including a main unfolding device arranged to cooperate with said gripping arrangement such that a corresponding reciprocal movement enables said blank to move from the folded planar configuration to the tridimensional unfolded configuration of said blank.

12. The operating group according to claim 11, and wherein said main unfolding device includes a suction device for retaining through a vacuum a third gripping face of the blank, which is on an opposite side to a first gripping face which is retained by the gripping arrangement, such that said gripping arrangement and said main unfolding device simultaneously retain said blank on opposite sides, to take said blank from said planar configuration to said tridimensional unfolded configuration when said gripping arrangement moves away from said main unfolding device.

13. The operating group according to claim 11, further including an auxiliary unfolding member that is configured for assisting said main unfolding device to take said blank from said planar configuration to said tridimensional unfolded configuration, said auxiliary unfolding member being configured as a fixed laminar element, in which said laminar element is oriented in space according to a set tilt, such that said laminar element contacts said blank laterally during the corresponding reciprocal movement of said main unfolding device and said gripping arrangement.

14. The operating group according to claim 11, wherein said main unfolding device is fixed to a fixed support structure, with which an adjusting device is associated that is arranged to adjust the position of said main unfolding device.

* * * * *